(No Model.)
C. B. HARRIS.
FIRE EXTINGUISHING APPARATUS.
No. 411,192. Patented Sept. 17, 1889.
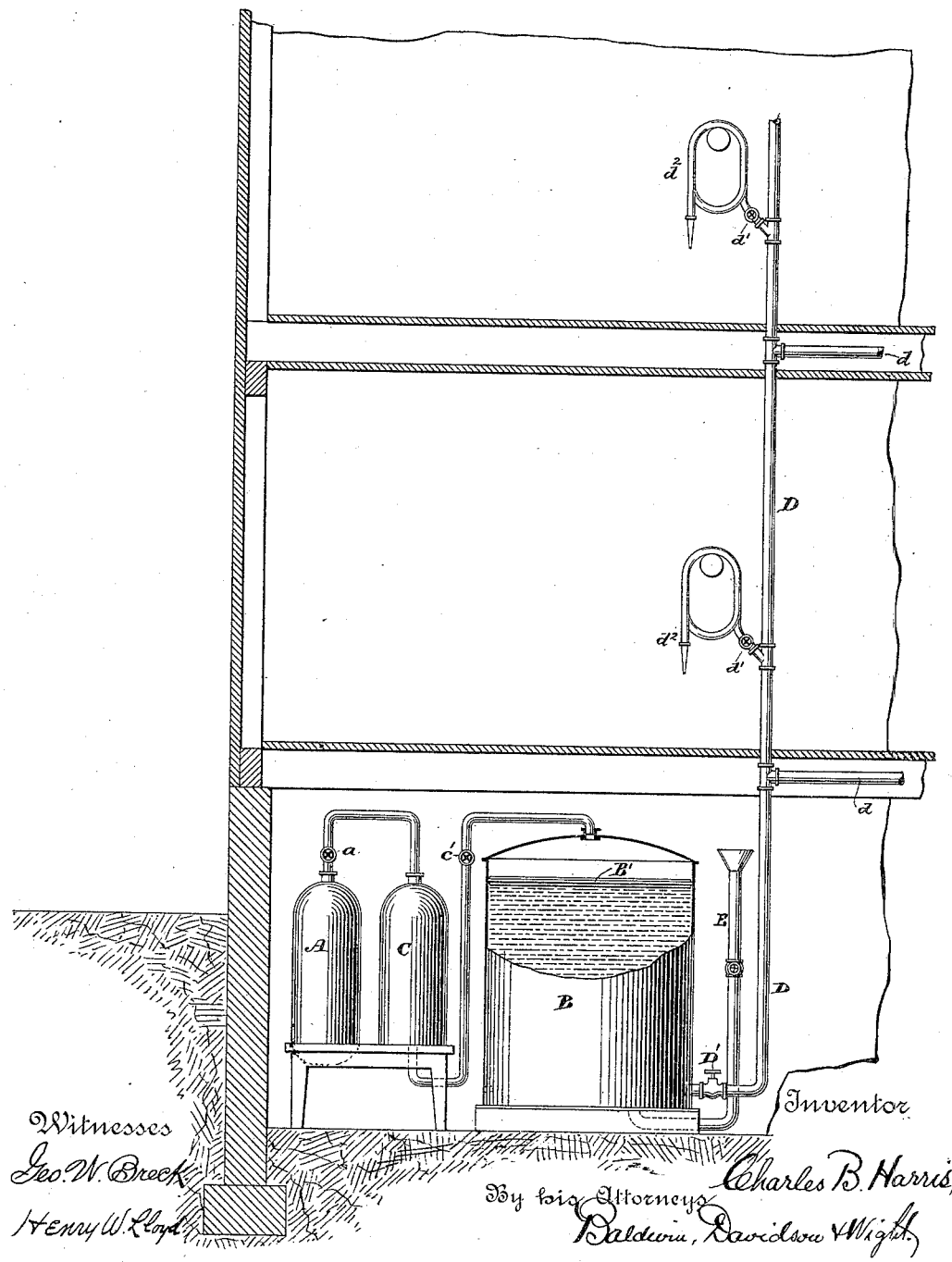
Witnesses
Geo. W. Breck
Henry W. Lloyd
Inventor
Charles B. Harris,
By his Attorneys
Baldwin, Davidson & Wight

UNITED STATES PATENT OFFICE.

CHARLES B. HARRIS, OF NEW YORK, N. Y.

FIRE-EXTINGUISHING APPARATUS.

SPECIFICATION forming part of Letters Patent No. 411,192, dated September 17, 1889.

Application filed May 17, 1889. Serial No. 311,153. (No model.)

*To all whom it may concern:*

Be it known that I, CHARLES B. HARRIS, a citizen of the United States, residing in the city, county, and State of New York, have invented certain new and useful Improvements in Fire-Extinguishing Apparatus, of which the following is a specification.

My invention relates to that class of apparatus in which the expansion of carbonic acid affords the power by which the fire-extinguishing fluid is ejected.

The purpose of the invention is to provide an organization in which the expansion of the acid is prevented from freezing the water, which I preferably employ as the means of extinguishing fire.

To this end the invention primarily consists in interposing between the vessel containing the carbonic acid and the tank containing the water an expansion-chamber within which the carbonic-acid gas first expands before its admission to the water or fluid tank.

A further purpose of the invention is to prevent the too free admixture of the gas with the water or other fluid; and to this end the invention consists in arranging a float or plunger upon the surface of the water in the tank, the expanding gas acting upon the float to expel the water. This float also assists in preventing the congealing of the contents of the tank.

A further purpose of the invention is to adapt this system to country houses or isolated places where there is no proper water-supply under pressure.

The accompanying drawing is a vertical section through a portion of a building, showing my improved organization with the water-tank partly broken away.

A represents a cylinder or holder for carbonic acid. It connects, through a pipe supplied with a cock $a$, with an expansion-chamber C, in which gas first expands when the cock $a$ is opened. The expansion-chamber connects by pipe having a cock $c'$ with the upper part of the tank B to be filled with a fire-extinguishing liquid, preferably water. This tank may be of any suitable cross-section, but is preferably circular. A float or plunger B', that may be provided with suitable packing, floats upon the surface of the water in the tank.

D represents a system of distributing-pipes provided with various branches $d$, extending to different parts or rooms of a building, each of which is provided with a stop-cock $d'$, and preferably with a section of flexible hose having a nozzle $d^2$. A cock D' closes communication between the pipe system and the bottom of the tank. In the event of a fire, the cock $a$, in the connection between the carbonic-acid holder and the expansion-chamber, is opened, and the cock D' in the distributing-pipe system is also opened, the expanding gas of the carbonic acid develops a high pressure (at certain temperatures as high as two thousand pounds to the square inch) first in the expansion-chamber and then upon the liquid or float in the tank D, thus driving the water through the pipe system D to the various points of discharge. Obviously this system may be used for irrigation or distribution of water for any purpose—such, for instance, as the periodic elevation of water to an elevated supply-tank.

With my organization it will be noted that the full power of the gas is attained upon the surface of the water, and that the float prevents the absorption of the gas by the water to a great extent. The water discharged from the nozzles has therefore more cohesion than if impregnated with gas and may be thrown a greater distance.

To fill the tank, I provide a pipe E, communicating with the bottom of the tank and having a stop-cock.

I claim as my invention—

1. The combination of the acid-holder, the expansion-chamber connected therewith by a pipe having a cock $a$, the fluid-tank, a connecting-pipe having a cock $c'$ between the expansion-chamber and top of the fluid-tank, the plunger or float in the fluid-tank, and the fluid-distributing pipe having a cock D', substantially as set forth.

2. The combination of the acid-holder, the gas-expansion chamber connected therewith by a pipe having a cock $a$, the fluid-tank, a connection having a cock $c'$, leading from the gas-expansion chamber to the top of the fluid-tank, and the fluid-distributing pipe connected at the bottom of the fluid-tank, and having a cock $D'$, substantially as and for the purpose set forth.

In testimony whereof I have hereunto subscribed my name.

CHARLES B. HARRIS.

Witnesses:
 AUGUSTUS MERRITT,
 EDWARD C. DAVIDSON.